April 7, 1925.                                                         1,532,509
F. MAHOOD
STEERING MECHANISM FOR TRACTORS
Filed Aug. 3, 1923
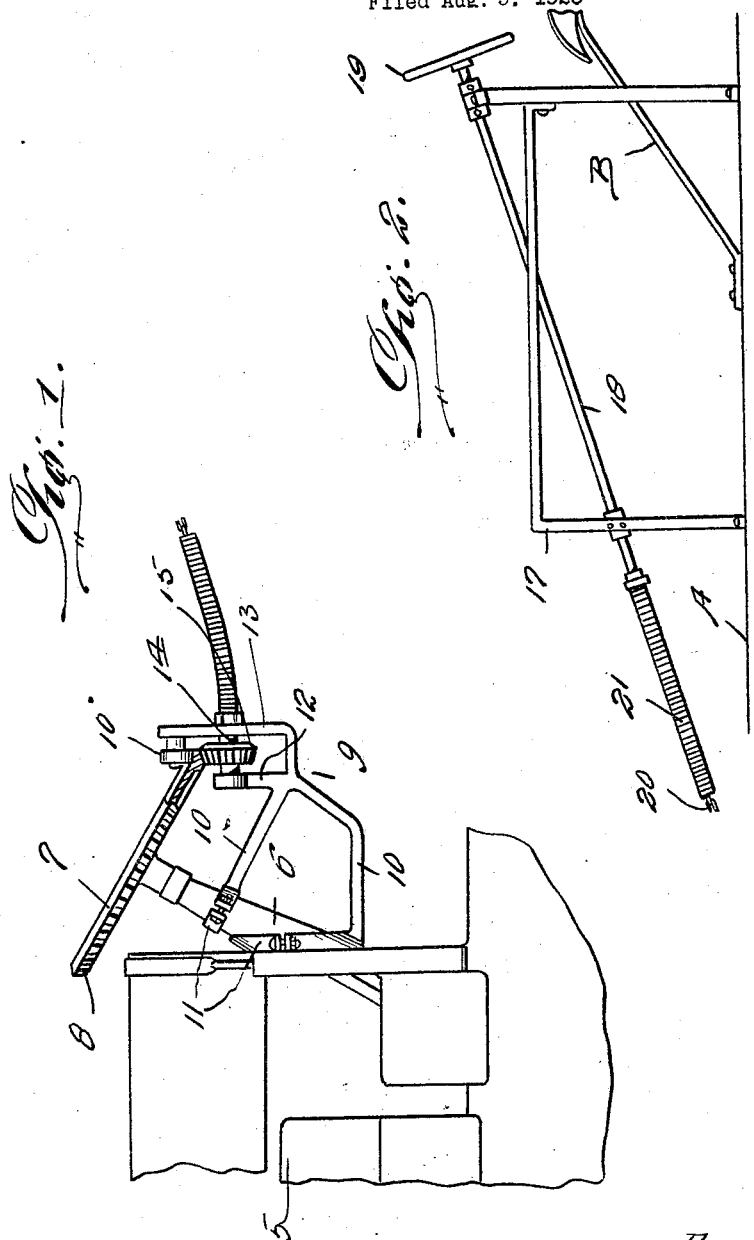
Frank Mahood,
Inventor
Witnesses:

Patented Apr. 7, 1925.

1,532,509

UNITED STATES PATENT OFFICE.

FRANK MAHOOD, OF AMITY, OREGON.

STEERING MECHANISM FOR TRACTORS.

Application filed August 3, 1923. Serial No. 655,394.

*To all whom it may concern:*

Be it known that FRANK MAHOOD, a citizen of the United States, residing at Amity, in the county of Yamhill and State of Oregon, has invented certain new and useful Improvements in Steering Mechanism for Tractors, of which the following is a specification.

In carrying out the present invention it is my purpose to provide a steering mechanism for tractors wherein the same may be properly steered from the binder, harvester, or other agricultural implements being drawn by the tractor thereby overcoming the necessity of providing an additional operator for controlling the steering movement of the tractor.

The primary object of this invention resides in the provision of such a steering mechanism for tractors that is extremely simple of construction and one that may be associated with a tractor and a binding, harvesting or other agricultural machines in a novel, simple and expeditous manner and this at a minimum expenditure.

With the above and other objects in view as the nature of the invention is better understood, the same comprises the construction, combination and arrangement of parts hereinafter described, shown in the accompanying drawing and claimed.

In the drawings wherein;

Figure 1 is a fragmentary side elevation of a conventional type of tractor equipped with a portion of my mechanism for controlling the steering thereof, and Figure 2 is a side elevation of the other portion of my improved steering mechanism that is mounted in position upon the binder, harvester, or other agricultural machines.

First, having particular reference to Figure 1 of the drawing, 5 designates generally a tractor of conventional design that includes the usual steering post 6 upon which is mounted a steering wheel. In the furtherance of my invention, the usual steering wheel that is mounted upon this post is removed and a steering wheel 7 is substituted therefor. This steering wheel 7 comprises an iron ring formed similar to the steering wheels now in use, the under side thereof being formed at its rim portion with gear teeth 8.

Detachably secured in position upon said post 6 is a shaft support designated generally 9, which shaft support comprises a pair of angularly related inwardly extending arms 10 that are clamped at 11 to said steering column. This shaft support 9 further includes a pair of spaced vertically arranged arms 12 and 13 respectively, the arm 13 being of greater length than the arm 12 as clearly shown in the views. Journaled between these two arms 12 and 13 is a set shaft 14 that carries a bevel gear 15, the teeth of which are adapted for intermesh with the above mentioned teeth 8 on said steering wheel 7. Carried by the upper end of said arm 13 is an inwardly extending roller 16 that has close contact with the rim of steering wheel 7 for maintaining the same in permanent engagement with said gear 14.

Upon the binder, harvester, or other agricultural machines, designated generally —A, is an inverted relatively U-shaped supporting frame 17 that is positioned upon said agricultural machine at a point directly forwardly of the operator's seat —B. Extending diagonally with respect to this frame 17 and suitably journaled therein is a shaft 18 that is equipped at its rearmost end with a hand wheel 19, the opposite end of this shaft being operatively connected to a chain shaft 20 within a flexible housing 21, this shaft 20 as well as said flexible housing extending forwardly to the shaft support 9 upon said tractor 5. The opposite end of this shaft 20 is operatively connected to the said shaft 14 that carries the before mentioned bevel gear 15.

It will therefore be seen that the tractor designated 5 may be steered by the operator of the binder, harvester or other agricultural machine —A, it of course being necessary in this instance to turn the hand wheel at 19 for thereby imparting rotation to the shaft 20 which consequently causes a rotation of the bevel gear 14 for thereby actuating the steering wheel 7.

Numerous advantages of a steering mechanism for tractors of this character will be at once apparent by those skilled in the art and even tho I have herein set forth the most practical embodiment of the present invention with which I am at the present time familiar, it is nevertheless to be understood that minor changes may be made therein without departing from the spirit and scope of the invention as claimed.

Having thus described my invention what I claim as new and desire to secure by Letters Patent is:—

A device of the class described comprising a supporting bracket embodying a pair of angularly disposed and spaced hanger arms provided at their free ends with clamps adapted to be connected to a steering rod post, said bracket also embodying a pair of vertically disposed long and short extensions disposed in spaced parallelism, said extensions being provided with aligned openings, a shaft journaled in said aligned openings and equipped with a pinion, operating means for said shaft, a hand wheel provided with teeth in mesh with the teeth of said pinion, an idler carried by the upper end of said long extension and engaging the peripheral portion of said hand wheel to maintain the same in mesh with said pinion, a frame provided with bearings, and a manually rotated shaft journaled in said bearings, said shaft being connected with the aforesaid operating means.

In testimony whereof I affix my signature.

FRANK MAHOOD.